(12) United States Patent
Hammerschick et al.

(10) Patent No.: US 11,219,848 B2
(45) Date of Patent: Jan. 11, 2022

(54) HOUSING MODULE OF A FLUID TREATMENT MODULE AND FLUID TREATMENT MODULE

(71) Applicant: Mann+Hummel GMBH, Ludwigsburg (DE)

(72) Inventors: Joerg Hammerschick, Asperg (DE); Pius Trautmann, Stuttgart (DE); Oliver Glueck, Stuttgart (DE); Tiago Felipe Wiedemann da Silva, Ehningen (DE); Ulrich Dehnen, Kornwestheim (DE); Stefan Kunze, Tuebingen (DE); Christopher Marc Sturgess, Korntal (DE); Alrun Spennemann, Stuttgart (DE); Andreas Kloz, Sachsenheim (DE); Dietmar Talmon-Gros, Oberstenfeld (DE); Michael Fasold, Auenwald (DE); Lars Bachmann, Moeglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 1049 days.

(21) Appl. No.: 15/654,347

(22) Filed: Jul. 19, 2017

(65) Prior Publication Data
US 2018/0021707 A1 Jan. 25, 2018

(30) Foreign Application Priority Data

Jul. 21, 2016 (DE) .......................... 102016008733.1

(51) Int. Cl.
*B01D 35/30* (2006.01)
*F02M 37/32* (2019.01)
(Continued)

(52) U.S. Cl.
CPC .......... *B01D 35/30* (2013.01); *B01D 35/005* (2013.01); *B01D 35/305* (2013.01); *F01M 1/10* (2013.01);
(Continued)

(58) Field of Classification Search
CPC .... B01D 35/30; B01D 35/005; B01D 35/305; B01D 2201/4023; B01D 2201/307;
(Continued)

(56) References Cited

U.S. PATENT DOCUMENTS

| 4,732,294 A | * | 3/1988 | Bohler | B01D 35/14 |
| | | | | 220/320 |
| 6,173,859 B1 | | 1/2001 | Schumann et al. | |
| 2011/0078986 A1 | | 4/2011 | Gorozidis | |

FOREIGN PATENT DOCUMENTS

| DE | 19536613 C1 * | 11/1996 | ............. B01D 35/30 |
| DE | 29723431 U1 * | 10/1998 | ............. B01D 35/30 |

(Continued)

*Primary Examiner* — Thomas M Lithgow

(57) ABSTRACT

A housing module of a fluid treatment module of a fluid system is provided with a fluid housing with inlet and outlet for fluid. The fluid housing has a housing part with a receiving chamber for a fluid treatment component for treatment of fluid and an installation opening, closable by a housing closure part, for installation of the fluid treatment component in the receiving chamber. A housing connecting section is provided for connecting the housing part and the housing closure part to each other. The housing module has an externally positioned support structure that surrounds the housing part like a sleeve and has a reinforcement region that extends about the housing connecting section. The support structure has a fastening region for attachment of the housing module on a holding component of the fluid system. The connection of the housing part with the housing closure part is a direct connection.

18 Claims, 2 Drawing Sheets

(51) Int. Cl.
*B01D 35/00* (2006.01)
*F01M 1/10* (2006.01)
*F01N 3/20* (2006.01)
*F01M 11/03* (2006.01)

(52) U.S. Cl.
CPC .......... *F01N 3/2066* (2013.01); *F02M 37/32* (2019.01); *B01D 2201/307* (2013.01); *B01D 2201/4023* (2013.01); *F01M 2001/1035* (2013.01); *F01M 2011/031* (2013.01)

(58) Field of Classification Search
CPC ................ F01N 1/10; F01M 2011/031; F01M 2001/1035; F02M 37/32
USPC ................................................. 210/232, 249
See application file for complete search history.

(56) References Cited

FOREIGN PATENT DOCUMENTS

| | | | | |
|---|---|---|---|---|
| DE | 29723431 | U1 | 10/1998 | |
| DE | 20108573 | U1 | 10/2002 | |
| DE | 102010063940 | A1 * | 6/2012 | ............. B01D 35/18 |
| EP | 3213804 | A1 | 6/2017 | |

* cited by examiner

HOUSING MODULE OF A FLUID TREATMENT MODULE AND FLUID TREATMENT MODULE

TECHNICAL FIELD

The invention concerns a housing module of a fluid treatment module of a fluid system, in particular of an internal combustion engine, in particular of a motor vehicle, comprising at least one fluid housing with at least one inlet for the fluid to be treated, with at least one outlet for treated fluid, with at least one housing part of plastic material, which comprises at least one receiving chamber for at least one fluid treatment component for treating the fluid, at least one installation opening, closable by a housing closure part, for installation of the at least one fluid treatment component in the at least one receiving chamber, and at least one housing connecting section for connecting the at least one housing part with the at least one housing closure part, wherein the housing module comprises at least one externally positioned support structure which comprises at least one reinforcement region that extends at least with sections thereof about the at least one housing connecting section.

Moreover, the invention concerns a fluid treatment module of a fluid system, in particular of an internal combustion engine, in particular of a motor vehicle, comprising at least one housing module which comprises at least one fluid housing with at least one inlet for the fluid to be treated, with at least one outlet for treated fluid, with at least one housing part of plastic material, which comprises at least one receiving chamber with at least one in particular exchangeable fluid treatment component for treating the fluid, at least one installation opening, closable by a housing closure part, for installation of the at least one fluid treatment component in the at least one receiving chamber, and at least one housing connecting section for connecting the at least one housing part with the at least one housing closure part, wherein the housing module comprises at least one externally positioned support structure which comprises at least one reinforcement region that extends at least with sections thereof about the at least one housing connecting section.

BACKGROUND OF THE INVENTION

DE 297 23 431 U1 discloses a filter housing with a removable cover, in particular for an oil filter of a motor vehicle. The cover comprises a reinforcement element in the area of the thread by which the cover can be screwed onto the housing bottom part. For example, a metal ring can be pushed in a simple way externally onto the cover in the area of the thread, wherein the thread is located in the interior of the cover and the cover is thus screwed externally onto the housing bottom part.

SUMMARY OF THE INVENTION

The invention has the object to design a housing module and a fluid treatment module of the aforementioned kind where a functionality and mechanical stability of the fluid housing can be further improved.

This object is solved according to the invention in that the at least one support structure comprises at least one fastening region for fastening the housing module on at least one corresponding holding component of the fluid system.

According to the invention, at least one support structure is provided which forms effectively an exoskeleton for the at least one fluid housing, i.e., the support structure grips around the housing part effectively like a sleeve. The at least one support structure forms at least with sections thereof a reinforcement for the at least one fluid housing.

With the at least one fastening region, the housing module can be fastened on a corresponding holding component of the fluid system. The holding component can be advantageously a motor housing part or a frame, in particular of an internal combustion engine and/or of a motor vehicle and/or of a cooler or the like.

The at least one support structure reinforces locally the fluid housing. The at least one reinforcement region of the at least one support structure contributes to reinforcement of the plastic material of the at least one housing part. The at least one reinforcement region reinforces in this context the at least one housing connecting section, in particular a thread section of a screw connection with the at least one housing closure part. In this way, connecting forces which act from the at least one housing closure part on the housing connecting section can be introduced better. With the fastening region of the at least one support structure, fastening forces which act when fastening the housing module on the corresponding holding component of the fluid system can be introduced better. Connecting forces, acting in particular when opening or closing the housing closure part from the at least one housing closure part on the housing connecting section, can be altogether transmitted by means of the at least one support structure onto the corresponding holding component of the fluid system through the reinforcement region and the at least one fastening region. In this way, the plastic material of the at least one housing part is mechanically relieved. According to the invention, the connection of the housing part with the housing closure part is direct, in a preferred embodiment in such a way that the support structure does not participate in the connection of the at least one housing part with the at least one housing closure part.

Materials with different mechanical properties are combined with each other in the fluid treatment module. The housing module is designed as a so-called hybrid module in which the at least one housing part of plastic material is combined with the at least one externally positioned support structure. Fluid treatment systems comprising or comprised of plastic material are particularly advantageous in particular in regard to their weight, an integration of functionality, and the costs. The invention enables that mechanical loads on the fluid treatment module can be absorbed and transmitted by the at least one externally positioned support structure. Moreover, the component strength, a fastening accommodation of external component groups, for example, cooler, crankcase venting or the like, is realized with the at least one support structure. The plastic material of the at least one housing part, on the other hand, is utilized for encapsulating the fluid as well as used for regions that are exposed to reduced mechanical loads. With the at least one housing part, a fluid guiding action and a system pressure absorption are realized. Accordingly, the main functions of the fluid treatment module are divided correspondingly onto the at least one housing part and the at least one support structure. In this way, a manufacturing expenditure, in particular an expenditure for tools and/or components, can be reduced. Accordingly, costs can be reduced correspondingly. Moreover, the weight of the fluid treatment module as a whole can be reduced.

Advantageously, the at least one support structure can be one part. In this way, it can be produced altogether as one piece. In this way, a manufacturing expenditure and/or an assembly expenditure can be reduced. Alternatively, the at least one support structure can be of a multi-part configuration. The at least one support structure may comprise several support structure sections, in particular support structure shells, which can be joined for assembly externally on the at least one housing part. In this way, the at least one housing part can be mounted easily between several support structure sections. In particular, at least one reinforcement region can be comprised of several ring sections which can be joined around the at least one housing connecting section for assembly.

Advantageously, at least one part of a multi-part support structure can be designed as a single part of its own. Accordingly, the at least one part of the multi-part support structure can be manufactured in a simple way as one piece.

Advantageously, at least one reinforcement region can be arranged on the at least one housing part and/or in the area of an interface of the at least one housing part with at least one housing closure part. In this way, the at least one reinforcement region can mechanically support and reinforce the at least one housing connecting section.

Further advantageously, the reinforcement region of the support structure can act for reinforcement exclusively on the housing part, preferably exclusively on the housing connecting section of the housing part. This means that an action of the support structure, in particular of the reinforcement region of the support structure, on the housing closure part does not exist. In this way, it is made possible that the housing closure part, in particular a cover, that is connected by a thread or a bayonet connection with the housing part, can be removed without the support structure having to be loosened. During this process, the housing part can remain fastened by means of the support structure on the holding component; this is advantageous for easy filter service.

Advantageously, the support structure can be provided with a mechanical connection between the at least one reinforcement region and the at least one fastening region. In this way, the forces can be transmitted between the at least one reinforcement region and the at least one fastening region.

Advantageously, the reinforcement region of the support structure can comprise at least one ring section, in particular can be annular. In this way, it can at least partially circumferentially surround the housing connecting section, in particular the installation opening, in particular relative to a connecting axis of the housing closure part with the housing part. In this way, the reinforcement region can better support in particular a thread section of the housing connecting section.

Advantageously, the fastening region of the support structure can at least partially form a connecting flange of the fluid treatment module. With the connecting flange, the fluid treatment module can be connected more easily to a corresponding holding component of the fluid system or fastened to it.

Advantageously, the housing closure part can be configured as a housing cover. The housing closure part can advantageously comprise or be comprised of plastic material. Accordingly, the housing part can be designed as a housing pot. The housing pot can be closed with the housing cover.

The fluid housing comprises at least one inlet for the fluid to be treated and at least one outlet for treated fluid. Through the at least one inlet, fluid can be supplied for treatment to the fluid housing, in particular the receiving chamber of the at least one fluid treatment component. Through the at least one outlet, treated fluid can be discharged from the fluid housing, in particular the receiving chamber.

Advantageously, the fluid housing, in particular at least one housing part, can comprise at least one interface for at least one connector, in particular a screw and/or plug-in connector or at least one socket or hose socket. By means of the connector, a fluid connection between the fluid housing and a fluid conducting system of the fluid system can be realized.

Advantageously, the housing part, in particular a housing pot, can comprise at least one inlet and/or at least one outlet for fluid. In this way, all supply lines and discharge lines can be realized on one component. In this way, assembly and connection of the fluid treatment system can be simplified. Alternatively or additionally, at least one passage, in particular an inlet and/or an outlet, can be realized on the at least one housing closure part.

Advantageously, the fluid treatment component can comprise or be comprised of at least one filter or a filter element for the fluid and/or at least one separating device for separating particles and/or other fluids from the fluid. The fluid treatment component can advantageously be arranged exchangeably in the fluid housing. For servicing purposes, in particular for cleaning and/or for exchange of the at least one fluid treatment component, the housing part can be opened by removal of the at least one housing closure part.

Advantageously, the fluid treatment component is arranged or can be arranged in the at least one receiving chamber in such a way that it separates an inlet for the fluid to be treated from an outlet for treated fluid.

The invention can be employed in particular in fluid-conducting devices with pressure-loaded components that require a local reinforcement with connection to a fastening section.

The fluid treatment module according to the invention can be designed as a treatment module, in particular filter module, for treatment, in particular purification, of fluids, in particular oil, fuel, water, cooling fluid, aqueous urea solution, hydraulic liquid, air, compressed air or the like. Such treatment modules can be designed in particular as oil filter module, fuel filter module, water filter module, aqueous urea solution filter module, air filter module, filter module for hydraulic liquid or the like.

The invention can be used in motor vehicles, in particular passenger cars, trucks, buses, agricultural and/or construction vehicles, construction/agricultural machines, compressors, industrial motors or other devices, in particular with internal combustion engines.

The invention can be used in connection with internal combustion engines of motor vehicles as well as in other types of fluid systems of motor vehicles or other machines, in particular agricultural machines or construction machines.

The invention enables in particular also in the field of trucks the use of fluid treatment systems, in particular fuel and/or oil filter modules, that at least partially, in particular predominantly, are comprised of plastic material, which in the past has been avoided due to the greater assembly forces (diameter of the cover) and the required longer service life.

In an advantageous embodiment, the housing part, in particular the housing connecting section, can comprise or be comprised of plastic material, in particular polymer material.

As needed, a thread region for at least one housing closure part can advantageously comprise or be comprised of plastic material, in particular polymer.

Advantageously, the housing part, in particular the housing connecting section, can be realized as an injection molded and/or cast part. In this way, the at least one housing part can be manufactured simply of plastic material.

In a further advantageous embodiment, the at least one fastening region of the support structure can comprise at least one fastening element and/or at least one fixation element. In this way, the fluid treatment module with the fastening region can be fastened and/or fixed better and/or simpler on the corresponding holding component.

Advantageously, the at least one fastening region, in particular at least one fastening element, can comprise at least one part of a screw connection.

Advantageously, the fastening element can comprise or can be a through hole, a screw lug, a bushing, a screw bushing, a fixation sleeve, a compression sleeve and/or a thread. A bushing, a bolt, a pin or a screw or the like can be passed through a through hole. A corresponding screw can be passed through a screw lug or a bushing. The at least one fastening element can be comprised of a material capable of bearing loads, in particular metal. In this way, an axial deformation by mounting forces can be avoided or reduced.

In a further advantageous embodiment, the at least one fastening element can be integrated into the support structure, in particular can be produced as one piece therewith or integrally formed thereon. The insertion part can be provided, for example, as a cast or forged part wherein in the process also the fastening elements can be produced. In this way, a stable connection between the at least one fastening element and at least one neighboring section of the at least one support structure can be realized. Moreover, in this way the at least one support structure can be produced more simply, in particular as one piece, with at least one fastening element.

Alternatively or additionally, at least one fastening element can be advantageously connected by means of at least one material-fusion and/or form-fit and/or force-locked connection, in particular a fitting, a plug-in connection, an adhesive connection, a weld connection, a solder connection, a clamping connection, a locking connection, a clip connection, a rotary and/or plug-in connection, in particular a screw connection, or the like or a combination of several types of connection, with a part of the at least one support structure.

Advantageously, at least one fastening element for a screw connection can be integrated in the at least one support structure. Screw connections can be easily closed and separated again.

In a further advantageous embodiment, at least one support structure can connect at least two fastening elements directly or indirectly with each other. In this way, a force transmitting connection between the at least two fastening elements can be realized with the at least one support structure.

Advantageously, at least two fastening elements can be arranged on a fastening leg.

In a further advantageous embodiment, at least one support structure can comprise at least one support section for at least one functional component of the fluid treatment module. In this way, a support of connectors and/or interfaces by joining with the at least one support structure and/or by integration of reinforcement measures beginning at the at least one support structure and extending into the connectors and/or interfaces can be realized.

Advantageously, at least one functional component of the fluid treatment system can comprise a through socket, in particular an inlet socket or an outlet socket, for the fluid. With the at least one support section, the corresponding through socket can be mechanically supported.

Advantageously, at least one of the functional components can be a sensor, in particular a pressure sensor, temperature sensor, flow rate sensor and/or mass flow sensor or the like. With the at least one support section, in a simple way a connection of sensors on plastic material of the housing part and/or on the at least one insertion part can be realized.

Advantageously, the at least one support structure can take over at least in partial areas the function of an intermediate flange. With the intermediate flange, the fluid treatment module can be connected with a corresponding connecting flange of the corresponding holding component.

Advantageously, the at least one holding component of the fluid system can comprise at least one counter flange for the at least one fastening region of the at least one support structure. At least one fastening region of the at least one support structure can be connected with a fixation device to a corresponding adjoining counter flange of the fluid system.

In a further advantageous embodiment, the at least one housing connecting section can comprise or at least partially form at least a portion of a rotatable and/or pluggable connection for connecting the at least one housing part to the at least one housing closure part. Rotatable and/or pluggable connections can be connected and/or disconnected by means of a rotation movement, a plug-in movement or a combined rotation/plug-in movement.

Advantageously, the rotatable and/or pluggable connection can at least comprise a screw connection, a plug-in connection, a locking connection, a bayonet closure-type connection or the like or a combination of several such connecting types. A screw connection is a combined rotary/plug-in connection where by means of a rotary movement about the connecting axis a plug-in movement axially to the connecting axis is effected.

Advantageously, the housing connecting section can comprise a thread and/or a part of a bayonet closure-type connection.

The housing connecting section of the fluid housing can be reinforced by means of the reinforcement section of the at least one support structure relative to the connecting axis in radial and/or axial direction.

In a further advantageous embodiment, the support structure can comprise or be comprised of metal, in particular die cast metal, sheet metal or the like, and/or composite material, in particular fiber-reinforced plastic material. In this way, the at least one support structure can be furnished with a greater stiffness. Moreover, by appropriate selection of the employed materials, a higher resistance relative to thermal and/or chemical influences can be achieved.

The at least one support structure can be comprised in this context of metal or composite material. It can also be comprised of a combination of several materials, in particular a combination of metal and composite material.

Advantageously, the support structure can be machined by non-cutting processes. In this way, it can be prevented that removed material, in particular chips that are produced upon processing by cutting, can contaminate the at least one support structure and thus the fluid housing.

The object is further solved for the fluid treatment module in that the at least one support structure comprises at least one fastening region for fastening the housing module on at least one corresponding holding component of the fluid system.

In other respects, the features and advantages that have been discussed in connection with the housing module according to the invention and the fluid treatment module according to the invention and their respective advantageous embodiments apply mutually and vice versa. The individual features and advantages, of course, can be combined with each other, wherein further advantageous effects may be produced that surpass the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims expediently also individually and combine them to other meaningful combinations.

In the Figures, same components are identified with same reference characters.

DETAILED DESCRIPTION

Figure 1:
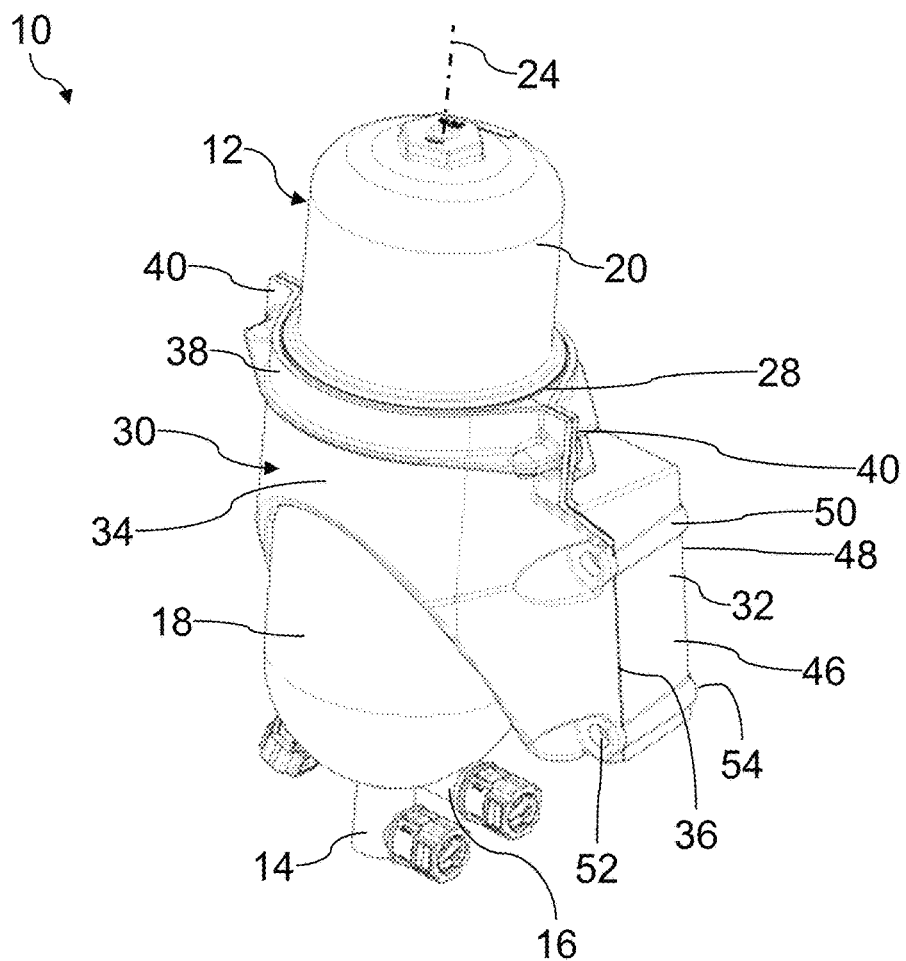
FIG. 1 shows an isometric illustration of a fluid filter module according to a first embodiment.
Figure 2:
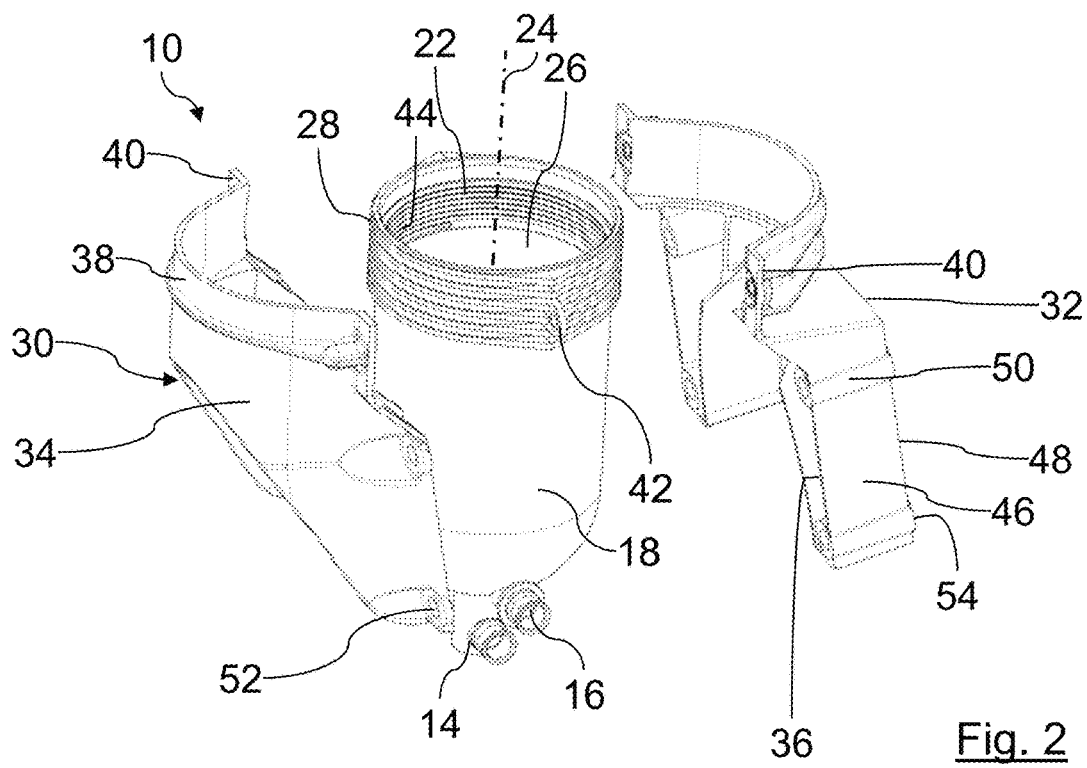
FIG. 2 shows an exploded illustration of the fluid filter module of FIG. 1 without housing cover.

In FIG. 1, a fluid treatment system in the form of a fluid filter module 10 according to a first embodiment is shown in isometric illustration. FIG. 2 shows a portion of the fluid filter module 10 in an exploded view. The fluid filter module 10 can be, for example, an oil filter module, a fuel filter module, or a different type of filter module for a liquid or gaseous fluid, for example, hydraulic liquid, water, aqueous urea solution, cooling liquid, air or the like. The fluid filter module 10 can be, for example, employed in connection with an internal combustion engine of a motor vehicle, for example, of a truck. The fluid filter module 10 serves in this context for purifying the corresponding fluid. It is arranged in a corresponding fluid system, for example, an oil circuit or fuel circuit.

The fluid filter module 10 comprises a fluid housing 12 with an inlet socket 14 for the fluid to be purified and an outlet socket 16 for the purified fluid. The inlet socket 14 and the outlet socket 16 are provided with corresponding quick-connect devices, shown in FIG. 1, for connection to corresponding hose conduits of the fluid system. A filter element as a fluid treatment component, not shown in FIGS. 1 and 2, is arranged in the fluid housing 12 in such a way that it fluidically separates the inlet socket 14 from the outlet socket 16. The corresponding fluid is filtered by the filter element in a way not of interest in this context and possibly contained particles are removed.

The fluid housing 12 comprises a housing part in the form of a housing pot 18 and a housing closure part in the form of a housing cover 20. In an exemplary fashion, the housing pot 18 and housing cover 20 each are produced of plastic material, for example, polymer, according to an injection molding process, for example.

The housing pot 18 comprises in an exemplary fashion a circular installation opening 22 for installation of the filter element. The installation opening 22 is coaxial to an imaginary axis 24. The installation opening 22 is closed off by the housing cover 20. Moreover, the housing pot 18 comprises an inlet socket 14 which is extending coaxial to the axis 24 into the housing pot 18 and the outlet socket 16 which is extending out of the housing pot 18 eccentric to the axis 24. In reverse flow direction of the fluid through the fluid filter module 10, the functions of the inlet socket 14 and of the outlet socket 16 can be switched.

The axis 24 coincides in the embodiment with a housing axis of the housing pot 18, an installation/removal axis of the filter element in the housing pot 18, and a connecting axis of the housing cover 20 with the housing pot 18. The housing pot 18 and the housing cover 20 are connected directly with each other, i.e., without the support structure 30 participating in the connection. The support structure 30, more precisely its reinforcement region 38, supports reinforcingly only the housing connecting section 28. This results advantageously in that the housing cover 20 can be separated from the housing pot 18 without the support structure 30 having to be loosened. Moreover, when removing the housing cover 20, the housing pot 18 in this way can also remain attached by the fastening region 46, 146 of the support structure 38 on the holding component of the fluid system.

For better clarity, in the following the housing axis, the connecting axis, and the installation/removal axis are provided with the same reference character 24 and are referred to as axis 24 for short. It is understood that, depending on the context, the housing axis, the connecting axis and/or the installation/removal axis is meant. When in the following "radial", "coaxial", "axial", "tangential", "circumferential", "concentric", "eccentric" or the like is mentioned, this relates to the axis 24, if nothing to the contrary is indicated.

Moreover, the housing pot 18 comprises a receiving chamber 26 for receiving the filter element. The inlet socket 14 and the outlet socket 16 open into the receiving chamber 26. The receiving chamber 26 is accessible from the exterior through the installation opening 22.

A wall region of the housing pot 18 surrounding the installation opening 22 forms a housing connecting section 28 for connecting the housing cover 20 with the housing pot 18.

A housing module of the fluid filter module 10 is embodied as a so-called hybrid module. It is comprised of the housing pot 18 with the housing cover 20 and an externally positioned support structure 30.

The support structure 30 is comprised of a connecting shell 32 and a back shell 34 and forms essentially a sleeve part so that it surrounds the housing pot effectively like a sleeve. The connecting shell 32 and the back shell 34 are positioned relative to the axis 24 on radially opposite sides. They are joined along a connecting plane 36 which is extending at a slant to the axis 24. The support structure 30 is comprised, for example, of die cast aluminum. The material of the support structure 30 is mechanically more stable than the plastic material of the housing pot 18.

The support structure 30 comprises an altogether annular reinforcement area 38, which, as shown in FIG. 2, is formed by the two shells (connecting shell 32 and back shell 34). The reinforcement region 38 has the shape of a round hollow cylinder. The reinforcement region 38 is arranged coaxially to the axis 24 about the housing connecting section 28. The housing pot 18 with the housing connecting section 28 is held, supported, and reinforced by the reinforcement region 38 in axial direction and radial direction in the reinforcement region 38 of the support structure 30.

The reinforcement region 38 is realized respectively approximately with one half on the connecting shell 32 and the other half on the back shell 34. The connecting shell 32 and the back shell 34 each comprise in the reinforcement region 38 on radial opposed sides two connecting tabs 40. The respective oppositely positioned connecting tabs 40 of the connecting shell 32 and of the back shell 34 are held together, for example, by means of a screw connection and in this way force the corresponding halves of the reinforcement region 38 against each other.

The housing connecting section 28 comprises on its radially opposed exterior sides a housing connecting tab 42, respectively, each arranged between the respective connecting tabs 40 of the connecting shell 32 and of the back shell 34 and clamped thereby, wherein a screw connection is extendable through a central cutout of the housing connecting tab 42.

The inner wall surface of the housing connecting section 28 has an inner thread 44 in the reinforcement region 38. The inner thread 44 is the pot-associated part of a screw connection with which the housing cover 20 can be separably connected in the installation opening 22 to the housing pot 18.

On the side which is axially facing away from the open side of the installation opening 22, the reinforcement region 38 transitions altogether into two fastening regions, each in the form of fastening legs 46. The fastening legs 46 are formed respectively approximately with one half on the connecting shell 32 and the other half on the back shell 34. The fastening legs 46 serve for attachment of the fluid filter module 10 on a holding component of the fluid system, for example, a frame of a motor vehicle or of an internal combustion engine.

The fastening legs 46 are located outside of the housing pot 18 on approximately opposite sides in radial direction relative to the axis 24. They extend each approximately parallel to each other away from the reinforcement region 38. The respective halves of the fastening legs 46 on the part of the connecting shell 32 form a connecting flange 48 with which the fluid filter module 10 can be attached to the holding component of the fluid system.

Each fastening leg 46 comprises on the part of the connecting shell 32 two fastening elements 50, here through bores. The fastening elements 50 are thus integrated into the support structure 30. The imaginary axes of the total of four fastening elements 50 extend parallel to each other and at a slant tangentially to an imaginary cylinder about the axis 24. When the fluid filter module 10 is mounted, a through hole 52 as an extension of the respective fastening elements 50 is arranged, respectively, on the part of the back shell 34 for an appropriate fastening means, for example, screws or bolts, for attachment on the holding part of the fluid system or support means of the holding part. The through holes 52 form thus fastening elements on the part of the back shell 34.

The end faces 54 of the fastening elements 50 which are facing away respectively from the connecting plane 36 of the connecting shell 32 with the back shell 34 are positioned in an imaginary plane which is extending perpendicular to the axes of the fastening elements 50. The plane with said end faces 54 extends at a slant to the axis 24 on a side of the connecting plane 36.

One of the two fastening elements 50, respectively, of a respective fastening leg 46 is positioned at a transition of the reinforcement region 38 into the corresponding fastening leg 46. The other fastening element 50 is located in the area of the free ends of the respective fastening leg 46.

Figure 3:
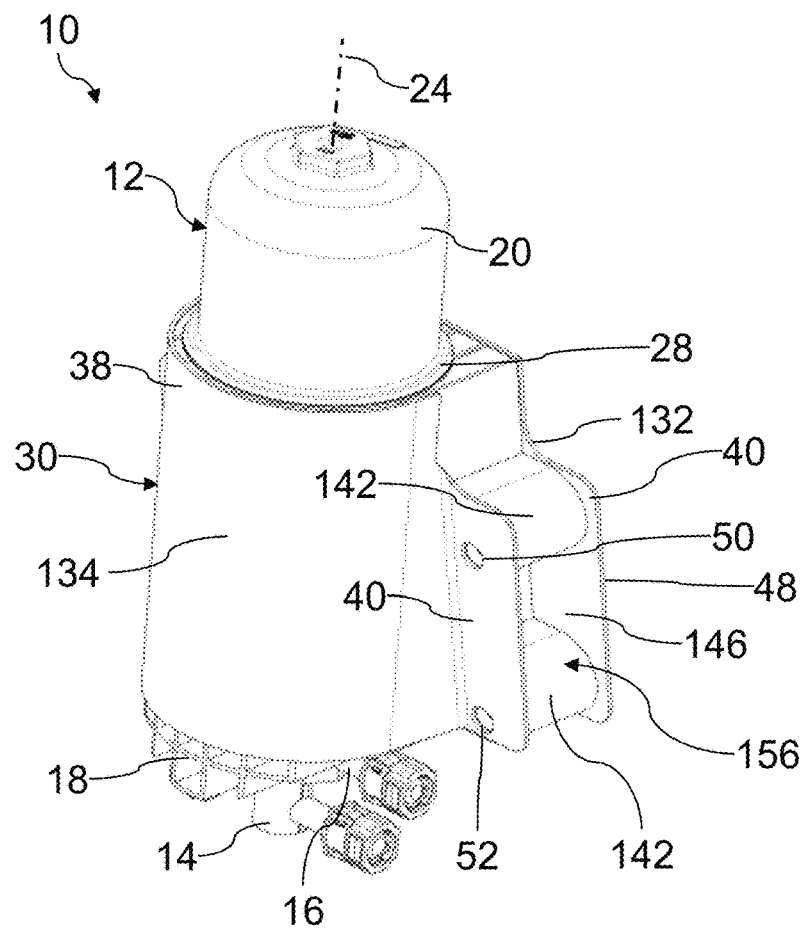
FIG. 3 shows an isometric illustration of a fluid filter module according to a second embodiment.
Figure 4:
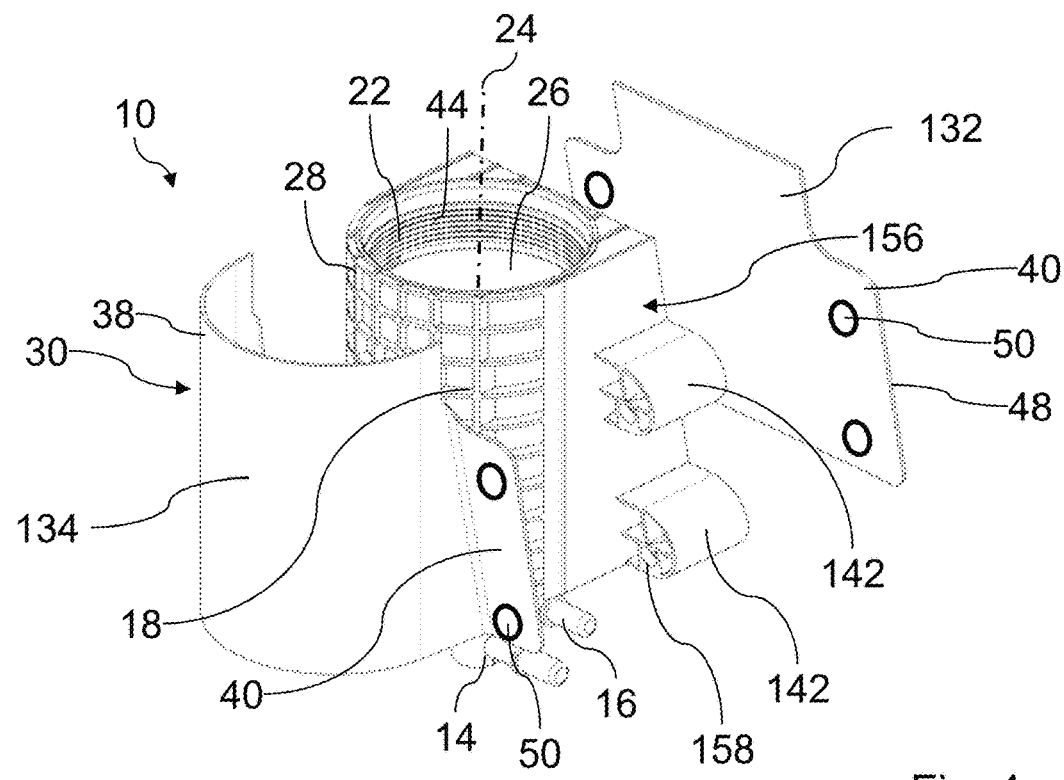
FIG. 4 an exploded illustration of the fluid filter module of FIG. 3 without housing cover.

In FIGS. 3 and 4, a fluid filter module 10 according to a second embodiment is illustrated. Those elements which are similar to those of the first embodiment of FIGS. 1 and 2 are provided with the same reference characters. The second embodiment differs from the first embodiment in that a connecting shell 132 is realized as a flat sheet metal. In the second embodiment, a continuous fastening region 146 is provided instead of two fastening legs 46. A back shell 134 is realized as substantially one half of a hollow cylinder which is extending approximately coaxial to the axis 24. The hollow cylinder half of the back shell 134 extends axially almost across the entire height of the housing pot 18 and surrounds the latter about half of its circumference. Oppositely positioned connecting tabs 40 of the back shell 134 extend almost across the entire height of the back shell 134 in radial outward direction.

On the radial outer circumferential side of the housing pot 18, a housing fastening section 156 is provided. The housing fastening section 156 extends between oppositely positioned first and second circumferential sides of the housing pot 18 along a third circumferential side extending between these two circumferential sides. On the aforesaid third circumferential side, the housing fastening section 156 extends on its side facing the connecting shell 132 along an imaginary plane. Corresponding sections of the housing fastening section 156 are positioned on the corresponding flat side of the connecting shell 132 in flat contact.

At the aforementioned first and second circumferential sides, the housing fastening section 156 comprises two housing connecting tabs 142, respectively, on radially oppositely positioned exterior sides relative to axis 24. The housing connecting tabs 142 are realized integrally with the housing fastening section 156. The housing connecting tabs 142 each have the shape of one half of a circular cylinder whose axes are parallel to each other and extend tangentially at a slant to an imaginary cylinder about axis 24.

When the fluid filter module 10 is assembled, the housing connecting section 28 and the housing fastening section 156 are clamped with the housing connecting tabs 142 between the connecting shell 132 and the back shell 134.

Each housing connecting tab 142 comprises a continuous straight through channel 158 whose axes extend parallel to the corresponding axes of the housing connecting tabs 142. On the part of the connecting shell 132 and on the part of the back shell 134, a through hole 52 is arranged, respectively, in extension of the respective through channels 158. The through holes 52 form fastening elements on the part of the connecting shell 132 and on the part of the back shell 134. Corresponding fastening means, for example screws or bolts, can be passed through the through holes 52 and the through channels 158 for attachment on the holding part of the fluid system or support means of the holding part. With these fastening means, the back shell 134 and the connecting shell 132 are pressed together so that a reinforcement of the housing pot 18 clamped in between is improved.

The embodiment illustrated in FIGS. 3 and 4 is suitable, for example, for manufacture from sheet metal, in particular manufacture by a bending and welding process, while the embodiment of FIG. 1 and FIG. 2 represents a construction that is in particular optimized for casting.

While specific embodiments of the invention have been shown and described in detail to illustrate the inventive principles, it will be understood that the invention may be embodied otherwise without departing from such principles.

What is claimed is:

1. A housing module of a fluid treatment module of a fluid system, the housing module comprising:
   a fluid housing comprising:
   a housing part having:
   a receiving chamber configured to accommodate at least one fluid treatment component for treating the fluid; and
   an installation opening at as first axial end of the housing part and opening into the receiving chamber, the installation opening configured to for installation of the at least one fluid treatment component into the receiving chamber; and the installation opening and receiving chamber defining an installation axis extending through the installation opening and receiving chamber;

wherein the fluid housing further comprises:

a housing closure part arranged on and closing the installation opening of the housing part;

at least one housing connecting section connecting the housing part with the housing closure part to close the installation opening;

at least one inlet for a fluid to be treated; and at least one outlet for treated fluid;

a support structure externally positioned on the housing part and including:

a connecting shell extending circumferentially at least partially about an exterior of the housing part, the connecting shell including:

a first fastening region at a first circumferential end of the connecting shell;

a second fastening region at an opposite second circumferential end of the connecting shell;

wherein the fastening regions each comprise a plurality of through holes;

a back shell extending circumferentially at least partially about an exterior of the housing part, the back shell including:

a reinforcement region extending circumferentially at least partially about an exterior of the housing part;

a third fastening region at a first circumferential end of the back shell;

a fourth fastening region at an opposite second circumferential end of the back shell;

wherein the third and fourth fastening regions reach comprise a plurality of through holes;

wherein the third and fourth fastening regions are arranged axially below and radially outwardly from the reinforcing region;

wherein the support structure forms a sleeve part surrounding the housing part;

wherein, when the support structure is mounted to the housing part, the through holes of the fastening regions of the connecting shell are aligned with respective through holes of the fastening regions of the back shell to receive a fastening member therethrough;

wherein the housing part and the housing closure part are connected directly to each other by a direct connection;

wherein the fastening regions are configured for attachment of the housing module on at least one corresponding holding component of the fluid system;

wherein the connecting shell and the back shell form a sleeve part surrounding the housing part;

wherein the fastening regions project radially outward away from the housing part.

2. The housing module according to claim 1, wherein the support structure does not participate in the direct connection that connects directly the housing part and the housing closure part to each other.

3. The housing module according to claim 1, wherein the fastening regions of the connecting shell are formed as fastening region legs, the fastening region legs projecting radially outwardly from and axially beyond the reinforcing region of the connecting shell.

4. The housing module according to claim 1, wherein the housing part includes a housing fasting section having a plurality of radially projecting connecting tabs, the radially projecting connecting tabs each having a straight through channel;

wherein the through holes of the fastening regions are aligned with the straight through channels of the radially projecting connecting tabs to receive the fastening members therethrough.

5. A fluid treatment module of a fluid system, the fluid treatment module comprising:

the housing module according to claim 1;

at least one fluid treatment component for treating the fluid disposed in the receiving chamber of the housing part.

6. A fluid treatment module of a fluid system, the fluid treatment module comprising:

the housing module according to claim 1;

at least one fluid treatment component for treating the fluid disposed in the receiving chamber of the housing part.

7. The fluid treatment module according to claim 6, wherein the at least one fluid treatment component is exchangeable.

8. The fluid treatment module according to claim 6, wherein the housing part comprises or is comprised of plastic material.

9. The housing module according to claim 8, wherein the reinforcement region of the support structure is reinforcing exclusively the housing part.

10. The housing module according to claim 9, wherein the reinforcement region is exclusively reinforcing the housing connecting section.

11. The housing module according to claim 8, wherein the housing part comprises or is comprised of plastic material.

12. The housing module according to claim 11, wherein the at least one housing connecting section is comprised of plastic material.

13. The housing module according to claim 11, wherein the plastic material is a polymer.

14. The housing module according to claim 8, wherein the housing module further includes an inlet socket connected to the at least one inlet and an outlet socket connected to the at least one outlet;

wherein the support structure is configured to support the inlet socket or the outlet socket.

15. The housing module according to claim 8, wherein the housing connecting section comprises or forms at least partially at least one part of the direct connection that connects directly the housing part and the housing closure part to each other, wherein said direct connection is a rotatable and/or pluggable connection.

16. The housing module according to claim 8, wherein the support structure comprises or is comprised of metal; composite material; or a combination of metal and composite material.

17. The housing module according to claim 16, wherein the metal is die cast metal or sheet metal.

18. The housing module according to claim 16, wherein the composite material is fiber-reinforced plastic material.

* * * * *